(12) United States Patent
Yoo et al.

(10) Patent No.: US 11,480,917 B2
(45) Date of Patent: Oct. 25, 2022

(54) METHOD AND APPARATUS FOR RECONSTRUCTING THREE-DIMENSIONAL IMAGE BY USING DIFFRACTION GRATING

(71) Applicant: SANGMYUNG UNIVERSITY INDUSTRY—ACADEMY COOPERATION FOUNDATION, Seoul (KR)

(72) Inventors: Hoon Yoo, Suwon (KR); Jae Young Jang, Seoul (KR)

(73) Assignee: SANGMYUNG UNIVERSITY INDUSTRY-ACADEMY COOPERATION FOUNDATION, Seoul (KR)

( * ) Notice: Subject to any disclaimer, the term of this patent is extended or adjusted under 35 U.S.C. 154(b) by 112 days.

(21) Appl. No.: 17/104,107

(22) Filed: Nov. 25, 2020

(65) Prior Publication Data

US 2021/0157266 A1 May 27, 2021

(30) Foreign Application Priority Data

Nov. 26, 2019 (KR) .................. 10-2019-0153740
Sep. 29, 2020 (KR) .................. 10-2020-0127456

(51) Int. Cl.
*G03H 1/08* (2006.01)
*G03H 1/04* (2006.01)

(52) U.S. Cl.
CPC ... *G03H 1/0406* (2013.01); *G03H 2001/0421* (2013.01); *G03H 2001/0428* (2013.01)

(58) Field of Classification Search
CPC ......... G03H 1/0406; G03H 2001/0421; G03H 2001/0428; G03H 1/08; G03H 1/0866; G03H 2001/0883; G03H 1/0891; G03H 1/22; G03H 1/2202; G03H 1/2205; G02B 30/00; G02B 30/10; G02B 30/40
USPC .......... 359/9, 1, 22, 30, 31, 32, 33, 35, 462, 359/463, 466
See application file for complete search history.

(56) References Cited

FOREIGN PATENT DOCUMENTS

KR     2009050914 A  *  5/2009
KR      100932560 B1 * 12/2009

OTHER PUBLICATIONS

Jae-Young Jang, et al., "Computational reconstruction for three-dimensional imaging via a diffraction grating", Optics Express, Sep. 30, 2019, pp. 1-11, vol. 27, No. 20.

* cited by examiner

*Primary Examiner* — Arnel C Lavarias
(74) *Attorney, Agent, or Firm* — Sughrue Mion, PLLC

(57) ABSTRACT

A method of reconstructing a three-dimensional (3-D) image on the basis of a diffraction grating includes extracting parallax images from a raw image of an object photographed by using a diffraction grating and reconstructing a 3-D image from the extracted parallax image array by using a virtual pinhole model.

7 Claims, 11 Drawing Sheets

METHOD AND APPARATUS FOR RECONSTRUCTING THREE-DIMENSIONAL IMAGE BY USING DIFFRACTION GRATING

CROSS-REFERENCE TO RELATED APPLICATIONS

This application claims priority under 35 U.S.C. § 119 to Korean Patent Application No. 10-2019-0153740, filed on Nov. 26, 2019, and Korean Patent Application No. 10-2020-0127456, filed on Sep. 29, 2020, the disclosure of which is incorporated herein by reference in its entirety.

TECHNICAL FIELD

The present invention relates to a method of reconstructing a three-dimensional (3-D) image (or a method of restoring a 3-D image), and more particularly, to a method of reconstructing a three-dimensional (3-D) image by using a diffraction grating.

BACKGROUND

A parallax image array (PIA) for real three-dimensional (3-D) objects is one of the most effective forms for 3-D imaging, processing, and display since it contains a lot of perspective information for real 3-D objects and it enables numerical methods to be useful.

The captured PIA is utilized to display a real 3-D space using a lens array and is also converted to a series of depth-sliced images using a computational reconstruction process. Thus, acquiring a PIA is an essential part of the field of 3-D imaging.

Usually, using a camera array or a lens array with a camera is one of the optical devices to pick up a PIA for a 3-D scene.

Also, capturing a PIA through those optical methods is an active topic in the field of integral imaging and light field analysis.

The use of a camera array for capturing a PIA provides the advantage of high-resolution parallax images, comparing with a PIA using a lens array with a camera.

The higher resolution camera is engaged in the PIA pickup; the higher resolution images are reconstructed from the computational and optical reconstruction methods.

Thus, the high-resolution parallax images play a crucial part in a specific function such as high depth resolution.

However, a camera array is a high-cost and complicated imaging system, compared with other systems such as a lens array with a camera or a moving camera with an electro-mechanical control system.

Also, it sometimes requires the camera calibration and post-processing before and after picking up a PIA.

A moving camera may be an alternative for the camera array, but it is limited to use for the stationary 3-D scene.

A lens array is a relatively low-cost optical system. However, it has some problems such as optical aberrations and the barrel distortion since it consists of many single lenses.

Therefore, it deserves to develop an imaging system of picking up a PIA having advantages of low-cost and high-resolution for the 3-D imaging industry.

Recently, a novel method using a diffraction grating has been proposed for acquiring a PIA. The method consists of a diffraction grating plate and a camera.

The structure of the PIA-acquiring system using a diffraction grating with a camera is similar to that of a system using a lens array with a camera.

Thus, its optical structure is low-cost and even less complicated than the lens array-based system.

Moreover, a thin diffraction grating does not suffer from the problems in a lens array system.

Also, the parallax images through a diffraction grating are high-resolution. Therefore, a diffraction grating-based imaging system can be one of the promising techniques in 3-D imaging.

However, the researches on 3-D imaging by using a diffraction grating have been focused on acquiring a PIA optically. Researches on computational reconstruction using a diffraction grating have not been discussed yet.

SUMMARY

Accordingly, the present invention provides a method and apparatus for reconstructing a 3-D image by using a diffraction grating.

The object, advantages, features and aspects of the present invention will become apparent from the following description of the embodiments with reference to the accompanying drawings, which is set forth hereinafter.

In one general aspect, a method of reconstructing a three-dimensional (3-D) image on the basis of a diffraction grating by using a processor includes capturing, by using an imaging lens, parallax images diffracted by a diffraction grating, picking up the parallax images, captured by the imaging lens, onto a pickup plane, rearranging the parallax images, picked up onto the pickup plane, in a virtual image plane, and back-projecting the parallax images, rearranged in the virtual image plane, onto a reconstruction plane to reconstruct a 3-D image of a real object.

Other features and aspects will be apparent from the following detailed description, the drawings, and the claims.

DETAILED DESCRIPTION OF EMBODIMENTS

Hereinafter, embodiments of the present invention will be described in detail with reference to the accompanying drawings. The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

The terms used herein are for the purpose of describing particular embodiments only and are not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The present invention may provide a computational reconstruction method using a raw image obtained from a diffraction grating image.

The computational reconstruction method according to the present invention may include an optical analysis method of localizing each parallax image in a raw image and a back-projection method of reconstructing a volume in an extracted parallax image.

Figure 1A:
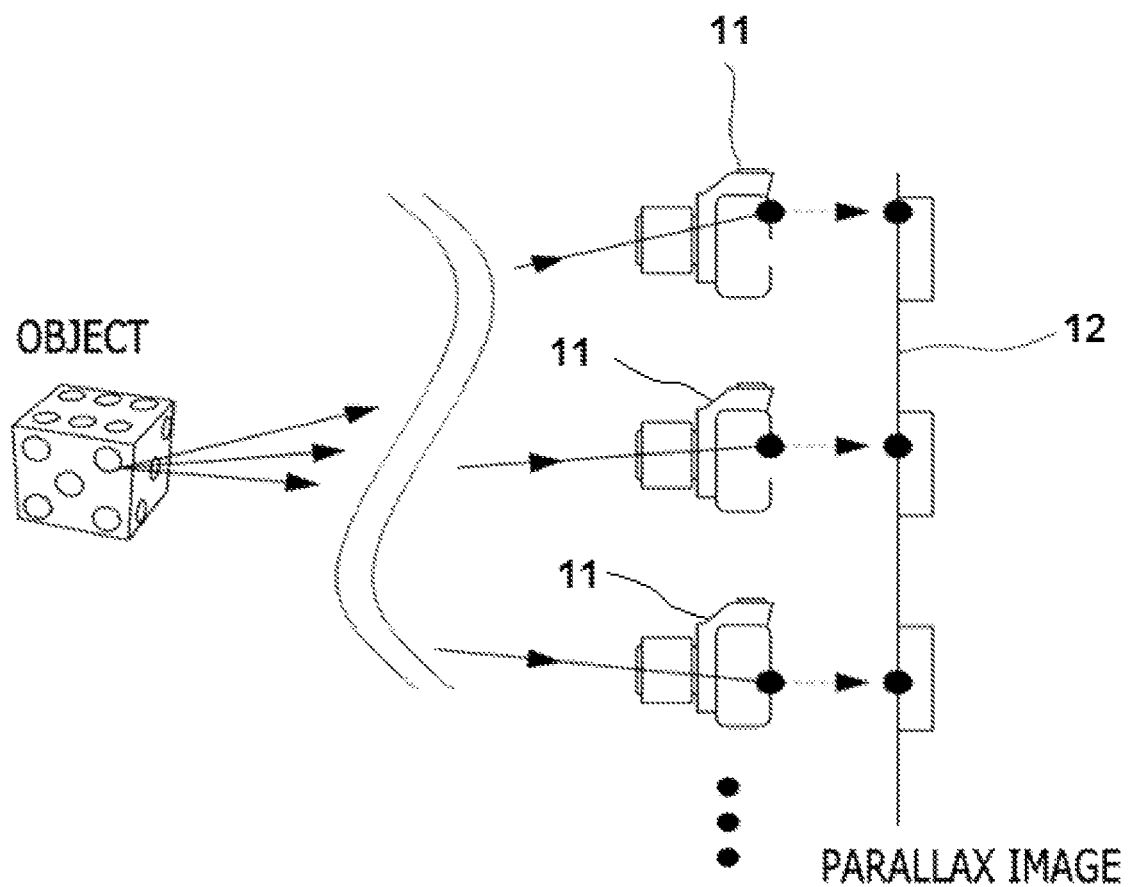
FIG. 1A is a diagram illustrating an optical structure of a PIA capturing system using a camera array associated with the present invention.
Figure 1B:
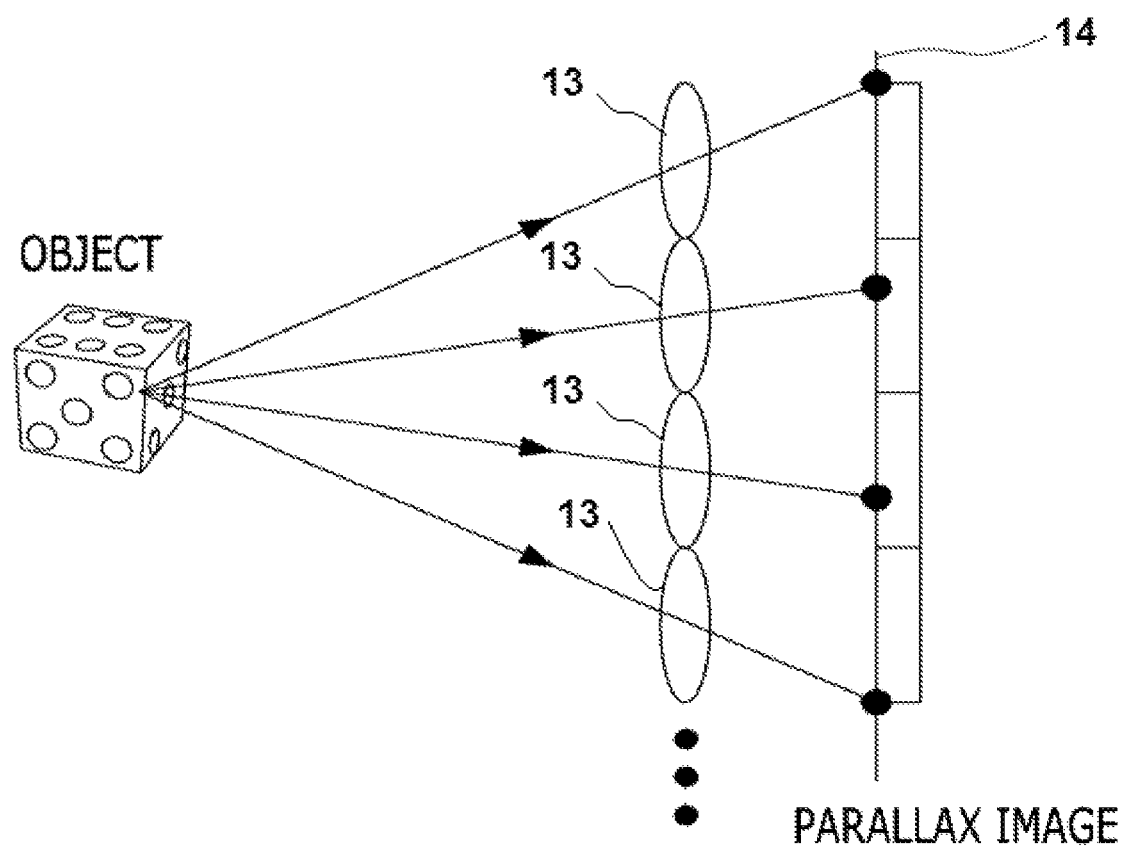
FIG. 1B is a diagram illustrating an optical structure of a PIA capturing system using a camera array associated with the present invention.
Figure 1C:
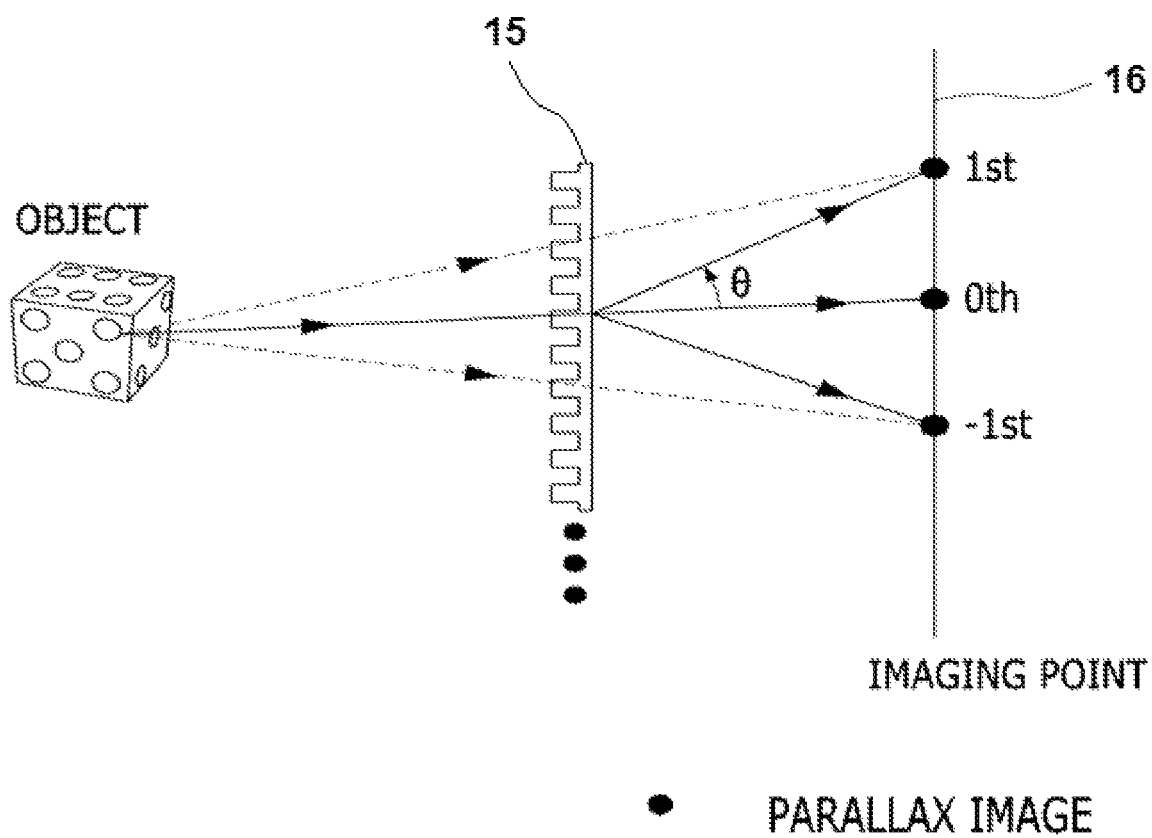
FIG. 1C is a diagram illustrating an optical structure of a PIA capturing system using a diffraction grating applied to the present invention.

FIG. 1A is a diagram illustrating an optical structure of a PIA capturing system using a camera array associated with the present invention. FIG. 1B is a diagram illustrating an optical structure of a PIA capturing system using a camera array associated with the present invention. FIG. 1C is a diagram illustrating an optical structure of a PIA capturing system using a diffraction grating applied to the present invention.

An optical structure using a diffraction grating according to the present invention, as illustrated in FIGS. 1A to 1C, may differ from an optical structure based on a camera array or a lens array.

As illustrated in FIG. 1A, an optical structure using an array of cameras 11 may not need an operation of extracting parallax images picked up onto a pickup plane 12 due to a separable structure of cameras.

As illustrated in FIG. 1B, an optical structure using an array of lens 13 may need a detection technique for detecting a lens pattern so as to segment a parallax image picked up onto a pickup plane 14, and this has been disclosed in reference documents known to those skilled in the art.

As illustrated in FIG. 1C, in an optical structure using a diffraction grating 15, the diffraction grating 15 may be transparent and there may be no pattern which is to be detected, and thus, it may not be easy to localize parallax images picked up onto a pickup plane 16 by the diffraction grating 15. Here, the localization of the parallax images may denote segmentation of parallax images.

In order to overcome such problems, the present invention may propose a 3-D computational reconstruction method based on the theoretical analysis of geometrical information about parallax images in diffraction gating imaging.

Figure 2:
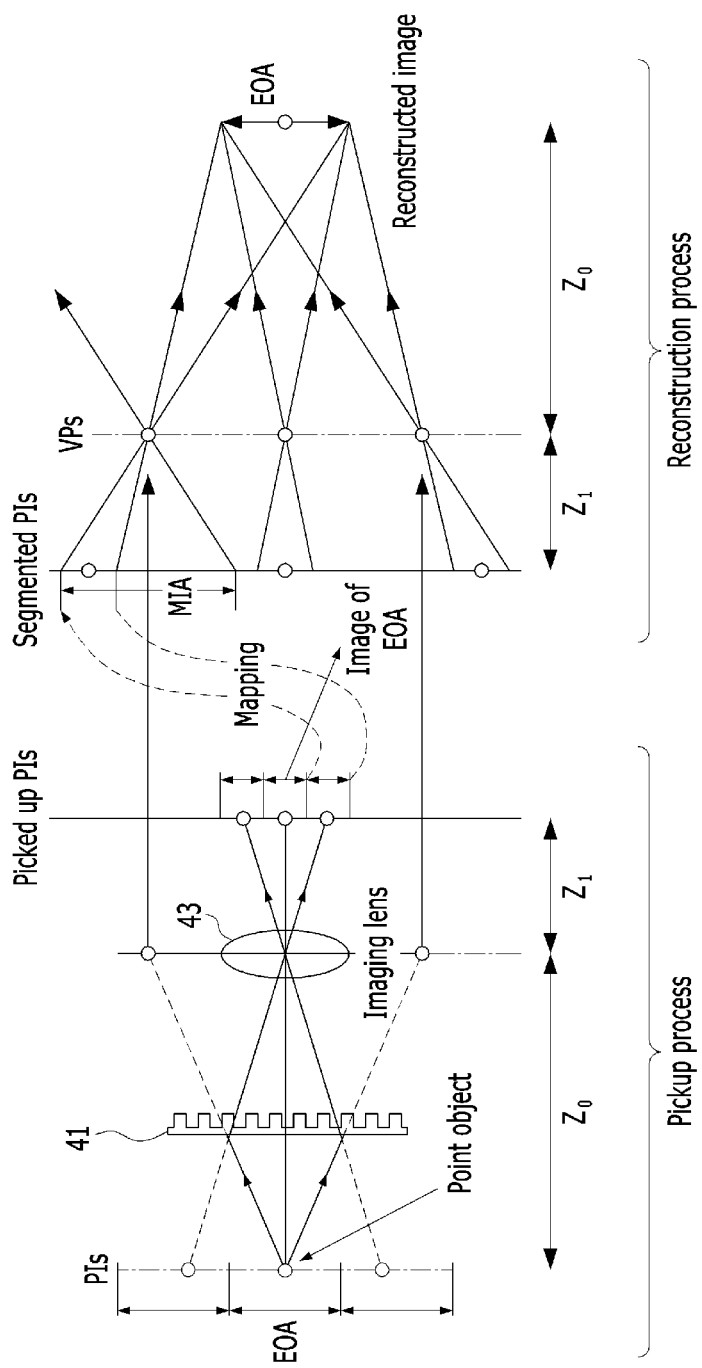
FIG. 2 is a schematic diagram of a relationship between a pickup process and a reconstruction process performed in a diffraction grating imaging system according to an embodiment of the present invention.

FIG. 2 is a schematic diagram of a relationship between a pickup process and a reconstruction process performed in a diffraction grating imaging system according to an embodiment of the present invention.

In FIG. 2, PI may represent a parallax image, VP may represent a virtual pinhole, and EOA may represent an effective object area. Also, MIA may represent a minimum image area.

Referring to FIG. 2, the diffraction grating imaging system according to an embodiment of the present invention may perform the pickup process and the reconstruction process.

The diffraction grating imaging system may include a diffraction grating 41 and an imaging lens 43 for performing the pickup process and may further include a computing device which performs a computing operation of reconstructing parallax images picked up onto a pickup plane through the diffraction grating 41 and the imaging lens 43 and includes the picked-up parallax images.

The computing device may include a processor, a memory, a storage medium, a communication unit, and a system bus connecting the elements and may execute an algorithm associated with the pickup process and the reconstruction process among the elements. An element for performing various operations on the basis of the executed algorithm may be a processor.

The processor may include one or more general-use microprocessors, digital signal processors (DSPs), hardware cores, application specific integrated circuits (ASICs), field programmable gate arrays (FPGAs), graphics processing units (GPUs), or an arbitrary combination thereof.

The storage medium may temporarily or permanently store an algorithm executed by a processor and intermediate data (an intermediate value) and/or result data (a result value) obtained from various arithmetic operations performed based on the execution of the algorithm, or may store various known algorithms for performing the pickup process and the reconstruction process, or may provide an execution space for an algorithm.

The storage medium may be referred to as a computer-readable medium, and the computer-readable medium may include random access memory (RAM) such as synchronous dynamic random access memory (SDRAM), read-only memory (ROM), non-volatile random access memory (NVRAM), electrically erasable programmable read-only memory (EEPROM), flash memory, and hard disk.

In analysis of the pickup process performed on 3-D objects using a diffraction grating, system parameters such as a wavelength of a light source, a spatial resolution of the diffraction grating 41, and positions of the diffraction grating 41 and the imaging lens 43.

The reconstruction process may be back-projection. Here, virtual pinholes may be defined for projecting parallax images onto a 3-D reconstruction space. A virtual pinhole VP may denote a virtual camera.

In the diffraction grating imaging system according to an embodiment of the present invention, a maximum area where 3-D objects are in a picked-up image not to overlap may be defined as an effective object area EOA, and an operation of detecting an effective object area EOA from obtained images may be needed for reconstruction in diffraction grating imaging.

Moreover, in the reconstruction process, a minimum image area MIA which is a view of minimum field of each virtual pinhole may be defined.

Moreover, mapping between the effective object area EOA and a minimum image area MIA may be needed for computational reconstruction, and Equations relevant thereto will be described below.

Pickup Process of 3-D Objects in Diffraction Grating Imaging

The diffraction grating 41 may diffract a light ray emanated from, a 3-D object. An operation of observing an object through the diffraction grating 41 by using the imaging lens 43 may be a basic concept of a pickup process in diffraction grating imaging.

Light ray diffracted by the diffraction grating 41 may be observed as perspective images of the 3-D object. In a case where an object space is observed through the diffraction grating 41, it may be considered that virtual images of an object are generated on a rear surface of the diffraction grating 41.

The virtual images may have parallaxes of the 3-D object and may be stored as a parallax image array PIA by a capturing device such as the imaging lens 43. Here, an imaging depth and size of a virtual object may be the same as those of an original 3-D object.

Figure 3:
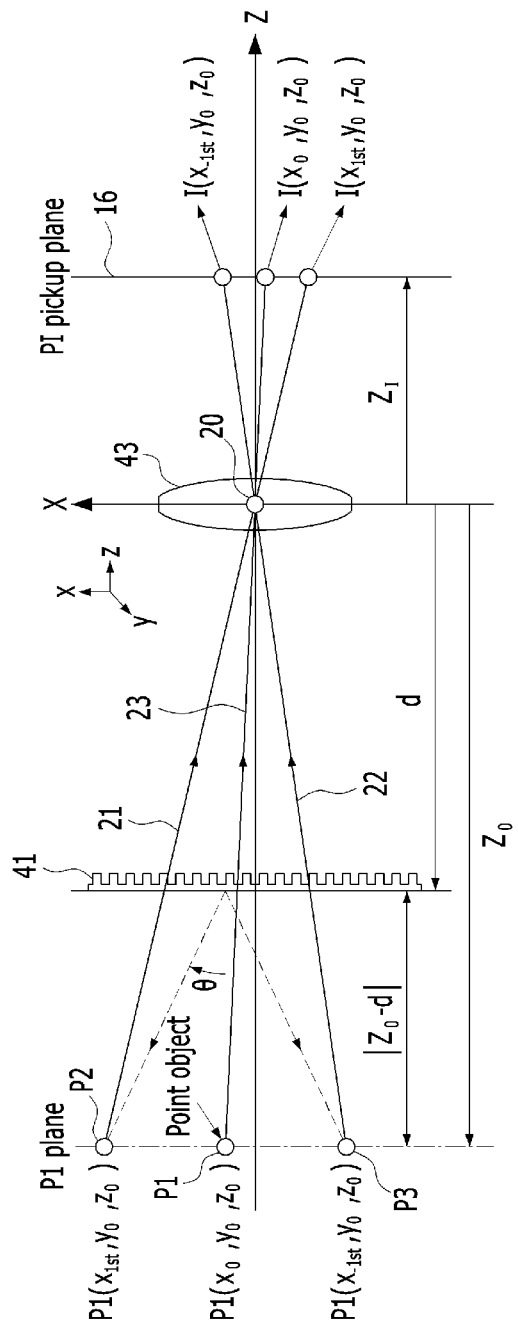
FIG. 3 is a diagram illustrating two-dimensional (2-D) geometrical relationships between a point object, parallax images of the point object in a parallax image (PI) plane, and parallax images captured by an imaging lens, according to an embodiment of the present invention.

FIG. 3 is a diagram illustrating two-dimensional (2-D) geometrical relationships between a point object, parallax images of the point object in a parallax image (PI) plane, and parallax images captured by an imaging lens, according to an embodiment of the present invention.

Referring to FIG. 3, it may be assumed that, in an x-y plane, the diffraction grating 41 is at a distance d from the imaging lens 43 and a point object P1 is $(x_O, y_O, z_O)$. Here, the point object may denote that an object included in a parallax image is expressed as a point, z-coordinates of all parallax images may be the same and may be $z_0$ on the basis of diffraction grating imaging, and $z_0$ may be construed as a distance from the imaging lens 43 to a parallax image (PI) plane.

As illustrated in FIG. 3, $-1^{st}$-order parallax image PI $(x_{-1st}, y_O, z_O)$ and $+1^{st}$-order parallax image PI $(x_{1st}, y_O, z_O)$ may be generated by $\pm 1^{st}$-order diffraction performed on a point object by the diffraction grating 41. A point object corresponding to $(x_O, y_O, z_O)$ may be used as a $0^{th}$-order parallax image.

A diffraction angle ($\theta$) between the $+1^{st}$-order parallax image PI $(x_{1st}, y_O, z_O)$ and the $0^{th}$-order parallax image PI $(x_O, y_O, z_O)$ may be calculated as $\theta = \sin^{-1}(\lambda/a)$. Here, $\lambda$ may denote a wavelength of a light source, and a may denote an aperture width.

Considering a diffraction order and a position of a point object, an x-coordinate of a parallax image may be expressed as the following Equation 1.

$$x_{mth} = x_o + |z_o - d|\tan\left(\sin^{-1}\left(\frac{m\lambda}{a}\right)\right) \quad \text{[Equation 1]}$$

Here, m may be $-1$, 0, and 1. A y-coordinate ($y_O$) may be obtained by replacing $x_O$ with $y_O$ in Equation 1. An imaging point I $(x_{mth}, y_{nth}, z_O)$ in a pickup plane 16 may be expressed as the following Equation 2.

$$I(x_{mth}, y_{nth}, z_o) = \left(\left(\frac{z_I}{z_o}\right)x_{mth}, \left(\frac{z_I}{z_o}\right)y_{nth}, z_I\right) \quad \text{[Equation 2]}$$

Here, m and n may be $-1$, 0, and 1, and $z_I$ may denote a z-coordinate of the pickup plane 16.

The diffraction grating 41 may generate a parallax image in a space where a z-coordinate of an object and a parallax image are the same.

It may be seen that a ray reaching I $(x_{1th}, y_O, z_O)$ in the pickup plane comes from PI $(x_{1th}, y_O, z_O)$, but only a ray emanated from a point object is real.

Therefore, a viewpoint of each parallax image may be described based on a relationship between a real ray 23 from a point object P1 and virtual rays 21 and 22 from virtual point objects P2 and P3 passing through an optical center 20 of the imaging lens 43.

Figure 4:
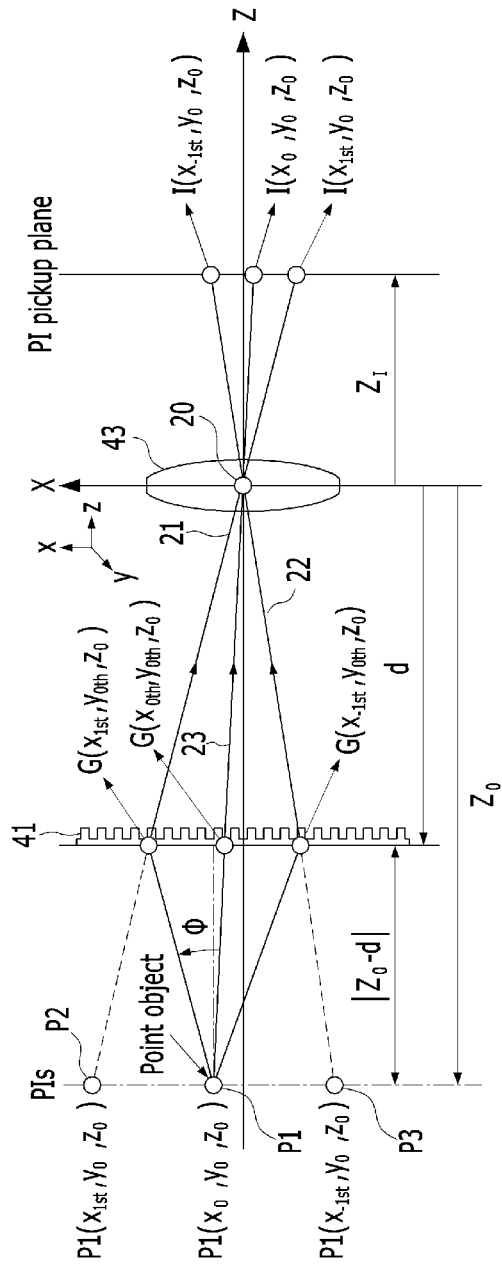
FIG. 4 is a diagram illustrating a geometrical relationship between a path of a chief ray from a point object and a path of each of virtual rays from a parallax image, according to an embodiment of the present invention.

FIG. 4 is a diagram illustrating a geometrical relationship between a path of a chief ray from a point object and a path of each of virtual rays from a parallax image, according to an embodiment of the present invention.

Referring to FIG. 4, virtual rays 21 and 22 toward an optical center 20 of an imaging lens 43 in $\pm 1^{st}$-order parallax images may meet a diffraction grating 41 at a point defined by a position function G $(x_{mth}, y_{nth}, z_O)$.

In a point G$(x_{mth}, y_{nth}, z_O)$, the diffraction grating 41 may change a patch a real ray 23 from a point object P1 to the optical center 20 of the imaging lens 43. The point G$(x_{mth}, y_{nth}, z_O)$ may he expressed as the following Equation 3.

$$G(x_{mth}, y_{nth}, z_o) = \left(\left(\frac{d}{z_o}\right)x_{mth}, \left(\frac{d}{z_o}\right)y_{nth}, d\right) \quad \text{[Equation 3]}$$

Here, m and n may be $-1$, 0, and 1.

Hereinafter, virtual pinholes for back-projection in diffraction grating imaging corresponding to a crucial part of a reconstruction process according to an embodiment of the present invention will be described.

Virtual Pinholes and Mapping Position of Parallax Image

Virtual pinholes may be regarded as a camera array. In order to implement a method of reconstructing a 3-D image, the present invention may provide formulas for the positions of the virtual pinholes corresponding to their parallax images and the mapping between parallax images and virtual pinholes.

As shown in FIG. 4, a ray radiating from the point object at an angle of Ø is determined to be a ray from a $1^{st}$-order parallax image located in $(x_{1st}, y_O, z_O)$. A ray irradiated onto an imaging point I $(x_{1st}, y_O, z_O)$ from PI $(x_{1st}, y_O, z_O)$ through the imaging lens 43 may have the same angle Ø.

The imaging point I $(x_{1st}, y_O, z_O)$ is considered to be a parallax image having an angle Ø with respect to a ray emitted from a point object P1. When another point having a depth $z_I$ in a pickup plane is assumed, a line which has the same parallax as an image I ($x_{1st}$, $y_O$, $z_O$) and passes through a point object and a point G ($x_{1st}$, $y_O$, $z_O$) may meet a pickup plane.

Figure 5:
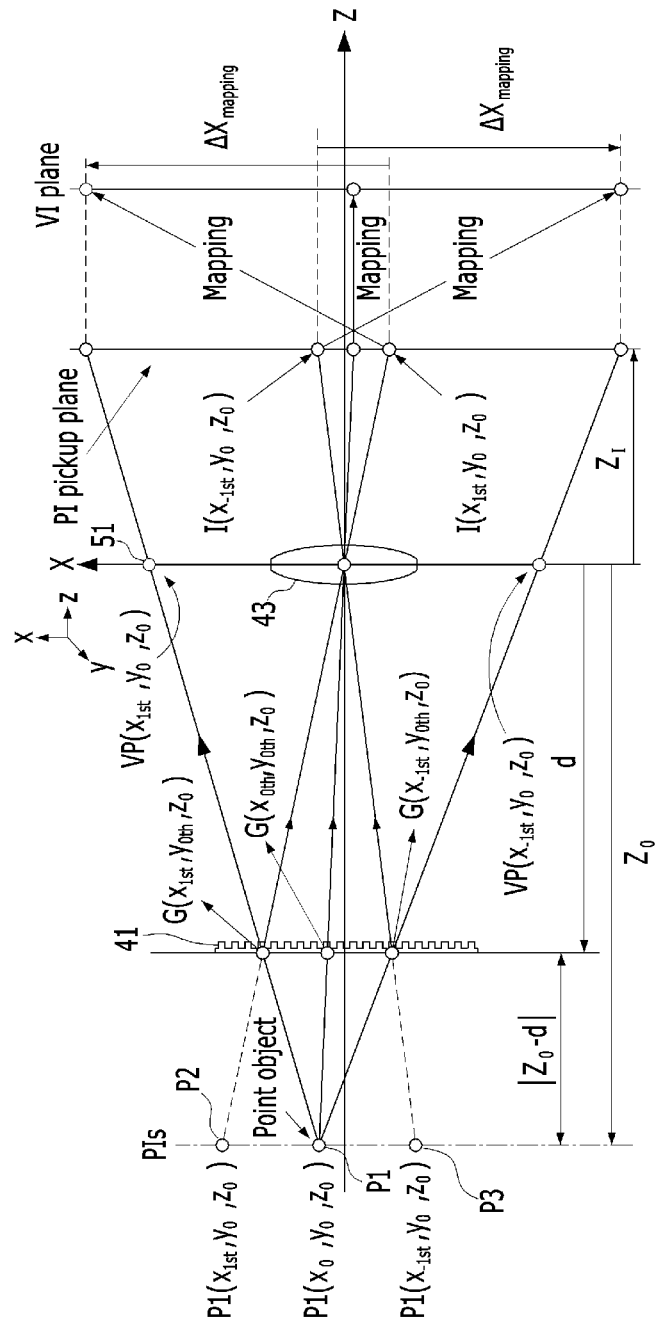
FIG. 5 is a diagram illustrating a geometrical relationship between a point object, a virtual pinhole (VP), a virtual image (VI) plane, and I $(x_{1st}, y_O, z_O)$, according to an embodiment of the present invention.

FIG. 5 is a diagram illustrating a geometrical relationship between a point object, a virtual pinhole (VP), a virtual image (VI) plane, and I ($x_{1st}$, $y_O$, $z_O$), according to an embodiment of the present invention.

As shown in FIG. 5, when it is assumed that an optical center of a virtual pinhole 51 located at one point of an x axis is a position function VP ($x_{mth}$, $y_{nth}$, $z_0$), the position function VP ($x_{mth}$, $y_{nth}$, $z_0$) may be expressed as the following Equation 4 by using Equations 1 and 3.

$$VP(x_{mth}, y_{nth}, z_o) = \left( \frac{(x_{mth} - x_o)d}{z_o - d}, \frac{(y_{nth} - y_o)d}{z_o - d}, 0 \right), \quad \text{[Equation 4]}$$

Here, m and n may be −1, 0, and 1.

Equation 4 may denote that, when orders of corresponding parallax images are the same, a position of each virtual pinhole is a unique value regardless of a position of an object.

However, Equation 4 may denote that a position of each virtual pinhole increases in an x direction and a y direction as a depth of an object increases, and the imaging lens 43 may be regarded as a $0^{th}$ virtual pinhole.

Hereinafter, a virtual image (VI) plane where a virtual image is provided will be described.

Virtual images may be images where an image I ($x_{mth}$, $y_{nth}$, $z_O$) of a pickup (PI) plane is rearranged in a virtual image plane. A position function of a virtual image may be regarded as VI ($x_{mth}$, $y_{nth}$, $z_O$)=(x, y, $z_I$). Here, m and n may be −1, 0, and 1.

$$x_{VImth} = \left( \frac{x_{mth}d}{z_o} - x_o \right) \frac{z_o - z_I}{z_o - d} + x_o. \quad \text{[Equation 5]}$$

In Equation 5, by replacing $x_O$ and $x_{mth}$ with $y_O$ and $y_{mth}$, a y-coordinate of a virtual image may be $y_O$.

A virtual image VI ($x_{mth}$, $y_{nth}$, $z_O$) may be used for a computational reconstruction method according to the present invention.

Such images may correspond to a shift version of a picked-up parallax image I ($x_{mth}$, $y_{nth}$, $z_O$) having a mapping factor $\Delta x_{mapping}$.

By using Equations 2 and 5, the mapping factor $\Delta x_{mapping}$ representing the amount of shift between the parallax image I ($x_{mth}$, $y_{nth}$, $z_O$) and a virtual image VI ($x_{mth}$, $y_{nth}$, $z_O$) may be expressed as the following Equation 6.

$$\Delta x_{mapping} = \left| \frac{z_I - d}{z_o - d}(x_o - x_{mth}) \right| \quad \text{[Equation 6]}$$

Parallax Image Segmentation and Reconstruction Method

In order to segment a parallax image, a field of view of each virtual pinhole may be determined based on an image area.

Unlike a raw image picked up by a lens array or a camera array, due to a transparent diffraction grating, it may be difficult to segment individual parallax images from a raw image captured by the diffraction grating 41.

Moreover, in diffraction grating imaging, when a size of an object is greater than a specific limit, parallax images may overlap one another.

A problem where parallax images overlap one another may be described based on a size of an object and a distance between the object and a diffraction grating.

In order to solve the problem, an effective object area (EOA) which a maximum size of an object may be defined.

For convenience, it may be assumed that a center of an effective object area (EOA) is aligned on an optical axis of the imaging lens 43.

Figure 6A:
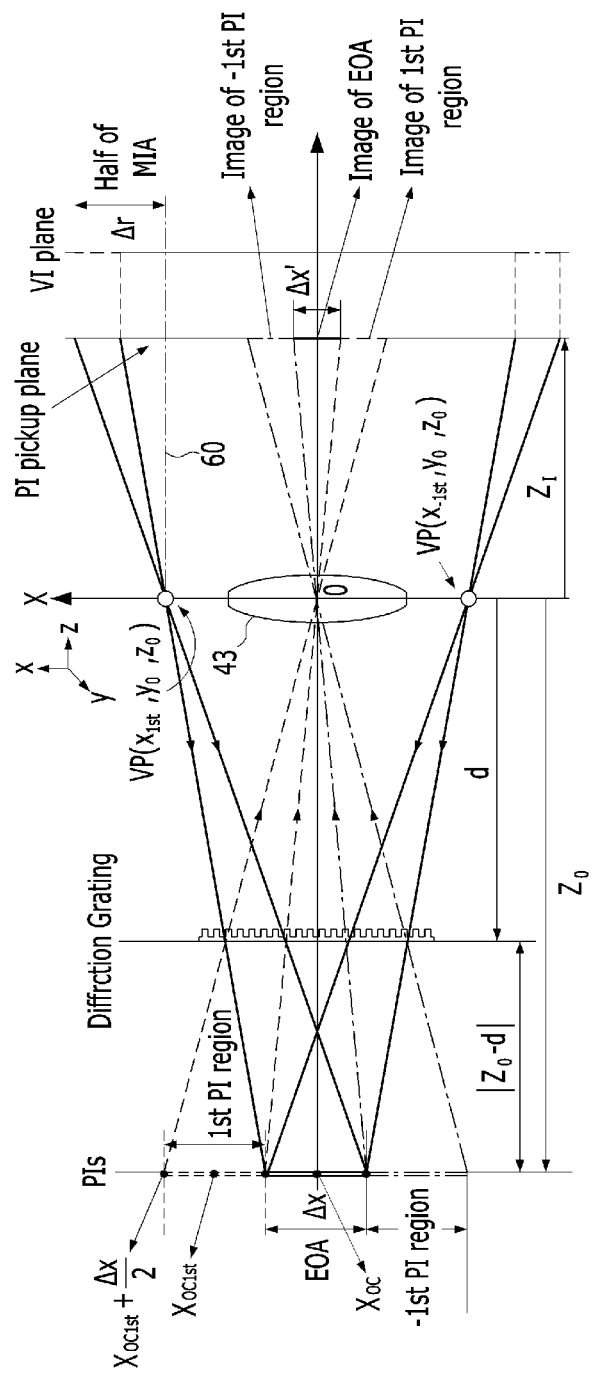
FIG. 6A is a diagram illustrating a geometrical relationship between an effective object area (EOA), a parallax image region, picked-up PI regions, virtual pinholes, and half of a minimum image area (MIA), according to an embodiment of the present invention.
Figure 6B:
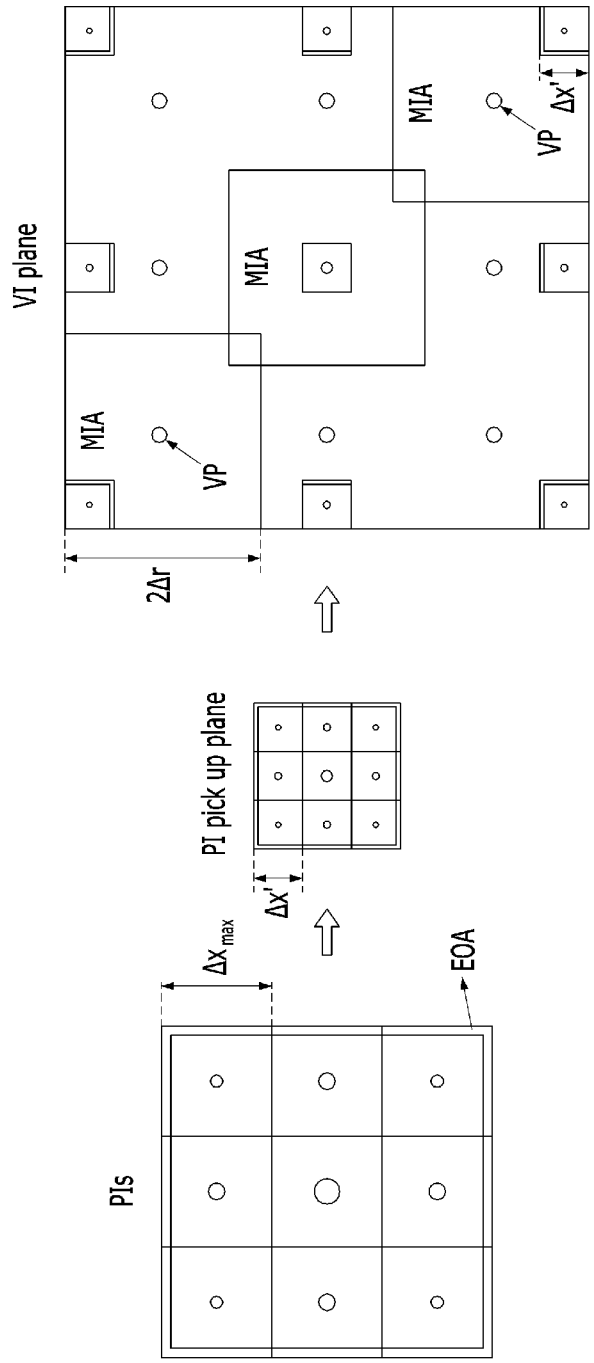
FIG. 6B is a diagram for showing a method of converting a parallax image of a raw object into a parallax image array for reconfiguration in a real 3-D space in an embodiment of the present invention.

FIG. 6A is a diagram illustrating a geometrical relationship between an effective object area (EOA), a parallax image region, picked-up PI regions, virtual pinholes, and half of a minimum image area (MIA), according to an embodiment of the present invention. FIG. 6B is a diagram for showing a method of converting a parallax image of a raw object into a parallax image array for reconfiguration in a real 3-D space in an embodiment of the present invention.

First, referring to FIG. 6, when an effective object area (EOA) is defined, a region of a parallax image may be defined.

In FIG. 6A, a $1^{st}$-order PI region and a $-1^{st}$-order PI region of an effective object area (EOA) may be respectively shown in red and green.

A boundary between picked-up PI regions may be determined based on Equation 2. Therefore, it may be possible to segment parallax images in a picked-up plane.

By using Equation 6, a region of a picked-up parallax image of a pickup plane may be mapped to a minimum image area (MIA) of a virtual image (VI) plane, and then, half of the minimum image area may be obtained from a distance from an optical axis 60 of a virtual pinhole VP to an edge of the picked-up parallax image region mapped to the virtual image plane.

When a point object is on the optical axis, a size of the effective object area (EOA) may be the same as a size of a $\pm 1^{st}$ PI region. A size $\Delta x$ may depend on a point $x_{OC}$ of the optical axis. By the size $\Delta x$ changing, a size of the $1^{st}$-order PI region may be changed with respect to a center ($x_{OC1st}$) dmf of a $1^{st}$-order PI. A maximum size $\Delta x$ (i.e., the effective object area (EOA)) may be expressed as the following Equation (7).

$$\Delta x_{max} = |z_o - d|\tan\left(\sin^{-1}\left(\frac{\lambda}{a}\right)\right), \quad \text{[Equation 7]}$$

Here, $\lambda$ may denote a wavelength of a light source, and a may denote an aperture width.

It may be seen in Equation 7 that the effective object area (EOA) (or a size of an EOA) is proportional to a distance ($|z_0 - d|$) between an object and a diffraction grating. Half of the minimum image area (MIA) $\Delta r$ may be expressed as the following Equation 8 based on Equations 4, 5, and 7.

$$\Delta r = \frac{z_I}{z_o}\left(d\tan\left(\sin^{-1}\left(\frac{\lambda}{a}\right)\right) + \frac{\Delta x_{max}}{2}\right) - \Delta x_{max}. \quad \text{[Equation 8]}$$

In FIG. 6B, a method of converting a parallax image of a circle object into a parallax image array for computational reconstruction in a real 3-D space is shown.

When an effective object area (EOA) is obtained based on Equation 7 described above in association with a circle object disposed in a left region of FIG. 6B, as shown in a middle region of FIG. 6B, a region of a raw parallax image picked up by the imaging lens 43 may be determined.

As shown in a right region of FIG. 6B, by using a mapping method based on a virtual pinhole and a minimum image area MIA, a parallax image array (PIA) may be generated in a virtual plane, for 3-D computational reconstruction.

Figure 7:
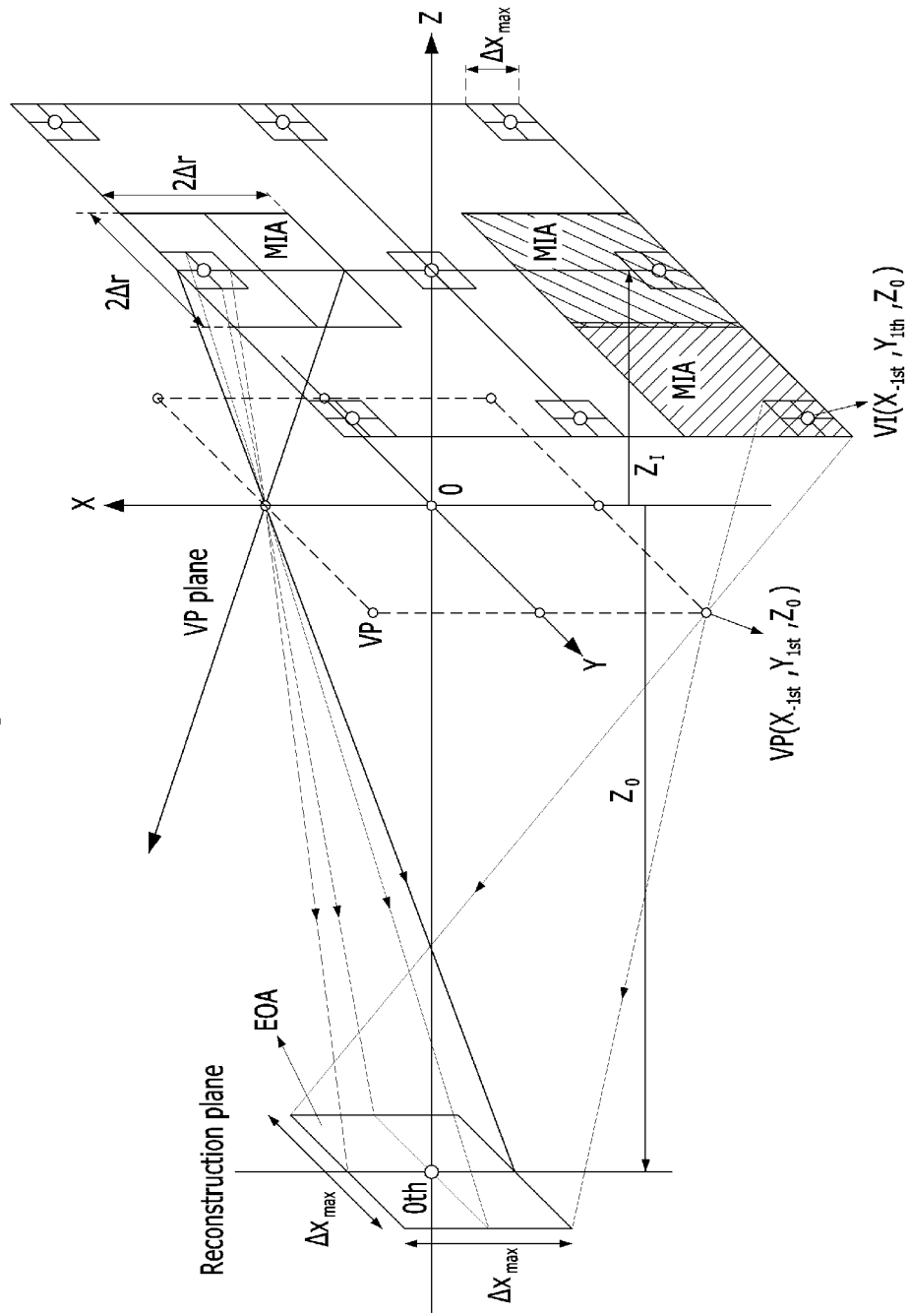
FIG. 7 is a diagram illustrating a process of performing back-projection for a reconfiguration plane by using a parallax image array (PIA), according to an embodiment of the present invention.

FIG. 7 is a diagram illustrating a process of performing back-projection for a reconfiguration plane by using a parallax image array (PIA), according to an embodiment of the present invention.

Referring to FIG. 7, back-projection may be performed on each MIA where each parallax image is provided, in a 3-D space passing through a virtual pinhole. A process of performing back-projection may be described as a process where shifted versions of parallax images overlap one another in a reconstruction plane. Here, a parallax image may be accurately obtained based on Equation 6.

Moreover, in a minimum image area MIA, overlapping may occur like being emphasized by blue and orange in FIG. 7. Back-projection of the minimum image area MIA may provide depth information for accurately focusing on an object image in a reconstruction plane. Here, a depth of the reconstruction plane may be the same as a position of an object. Accordingly, a computational reconstruction method based on diffraction grating imaging according to the present invention may determine the minimum image area MIA, detect a parallax image captured from the minimum image area MIA, and perform back-projection on the minimum image area MIA.

In a PIA generated by the computational reconstruction method according to the present invention, a position of a virtual pinhole and position information and size information about each element image may be defined well, and thus, a 3-D image may be reconstructed (restored) by a CIIR method known to those skilled in the art.

Figure 8:
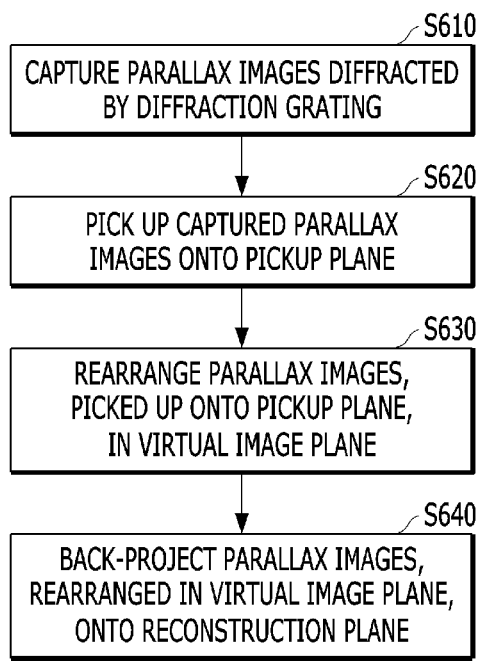
FIG. 8 is a flowchart illustrating a method of reconstructing a 3-D image by using a diffraction grating, according to an embodiment of the present invention.

FIG. 8 is a flowchart illustrating a method of reconstructing a 3-D image by using a diffraction grating, according to an embodiment of the present invention, and an element for performing each step described below may be a processor of a computing device.

Referring to FIG. 8, first, in step S610, parallax images diffracted by a diffraction gating may be captured by an imaging lens and may be stored as a parallax image array in a memory of the computing device.

Here, the diffracted parallax images may include a first parallax image PI ($x_0$, $y_0$, $z_0$) including a real object P1 and a second parallax image (PI ($x_{1st}$, $y_0$, $z_0$) and PI ($x_{-1st}$, $y_0$, $z_0$)) including virtual objects P2 and P3 corresponding to the real object P1, and the second parallax image may be an image obtained through diffraction which is performed with respect to the first parallax image, based on a wavelength of a ray emanated from the real object and a diffraction angle determined based on an aperture width of the diffraction grating.

Subsequently, in step S620, the parallax images picked up by the imaging lens may be picked up onto a pickup plane.

Subsequently, in step S630, the parallax images picked up onto the pickup plane may be rearranged on (mapped to) a virtual image plane.

Here, step S630 may be a process of segmenting the parallax images picked up onto the pickup plane on the basis of a geometrical relationship between the virtual image plane and a virtual pinhole defined in the same plane as the imaging lens and mapping the segmented parallax images to the virtual image plane on the basis of a mapping factor $\Delta x_{mapping}$.

The mapping factor may denote the amount of shift of the imaging point in an x-axis direction in the virtual image plane in a process of expressing a second parallax image as an imaging point in the pickup plane when the diffracted parallax images include a first parallax image including a real object and the second parallax image including the virtual object corresponding to the real object, the imaging lens is placed in an xy plane where a z-coordinate is 0 in a 3-D space capable of being expressed on an xyz axis, the pickup plane is placed in an xy plane where a z-coordinate is $z_I$.

The mapping factor may be calculated as expressed in Equation 6. In Equation 6, $x_0$ may denote an x-coordinate of the imaging lens, $x_{mth}$ may denote an x-coordinate of a diffracted parallax image, $z_o$ may denote a z-coordinate of the real object, and d may denote a distance from the imaging lens to the diffraction grating.

Moreover, step S630 may include a process of respectively mapping the picked-up parallax images to minimum image areas defined in the virtual image plane, and each of the minimum image areas may be determined based on a field of view of each of virtual pinholes defined in the same plane as the imaging lens. In this case, the picked-up parallax images may be mapped to edges in the minimum image areas.

Subsequently, in step S640, parallax images rearranged in the virtual image plane may be back-projected onto a reconstruction plane, and thus, a 3-D image of the rea object may be reconstructed.

According to the embodiments of the present invention, a parallax image array may be obtained based on a diffraction grating, and thus, comparing with a method using a camera array or a lens array, a parallax image array obtaining system which is low in cost and low in complexity may be implemented.

Moreover, in a parallax image array generated according to the present invention, a position of a virtual pinhole and size information and position information about each element image may be well defined, and thus, a 3-D image may be reconstructed by using the CIIR method known to those skilled in the art.

Moreover, a geometrical relationship between an effective object area (EOA), a picked-up PI region, a virtual pinhole, and a minimum image area (MIA) may be defined, thereby implementing a method of reconstructing a 3-D image by using a diffraction grating.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:
1. A method comprising:
capturing, by using an imaging lens, parallax images diffracted by a diffraction grating;
picking up the parallax images, captured by the imaging lens, onto a pickup plane;
rearranging the parallax images, picked up onto the pickup plane, in a virtual image plane; and
back-projecting the parallax images, rearranged in the virtual image plane, onto a reconstruction plane to reconstruct a 3-D image of a real object.

2. The method of claim 1, wherein
the diffracted parallax images comprise a first parallax image including the real object and a second parallax image including a virtual object corresponding to the real object, and
the second parallax image comprises an image obtained through diffraction which is performed with respect to the first parallax image, based on a wavelength of a ray emanated from the real object and a diffraction angle determined based on an aperture width of the diffraction grating.

3. The method of claim 1, wherein
the rearranging of the parallax images comprises segmenting the parallax images picked up onto the pickup plane based on a geometrical relationship between the virtual image plane and a virtual pinhole defined in a same plane as the imaging lens and mapping the segmented parallax images to the virtual image plane based on a mapping factor $\Delta x_{mapping}$, and
the virtual pinhole is a virtual camera defined in the same plane as the imaging lens.

4. The method of claim 3, wherein, when the diffracted parallax images include a first parallax image including the real object and a second parallax image including the virtual object corresponding to the real object, the imaging lens is placed in an xy plane where a z-coordinate is 0 in a 3-D space capable of being expressed on an xyz axis, the pickup plane is placed in an xy plane where a z-coordinate is $z_I$, the mapping factor $\Delta x_{mapping}$ is an amount of shift of an imaging point in an x-axis direction in the virtual image plane in a process of expressing the second parallax image as the imaging point in the pickup plane.

5. The method of claim 3, wherein, when the diffracted parallax images include a first parallax image including the real object and a second parallax image including the virtual object corresponding to the real object, the imaging lens is placed in an xy plane where a z-coordinate is 0 in a 3-D space capable of being expressed on an xyz axis, the pickup plane is placed in an xy plane where a z-coordinate is $z_I$, the mapping factor $\Delta x_{mapping}$ is expressed as Equation below, $$\Delta x_{mapping} = \left| \frac{z_I - d}{z_o - d} (x_o - x_{mth}) \right|$$

where $x_0$ denotes an x-coordinate of the imaging lens, $x_{mth}$ denotes an x-coordinate of a diffracted parallax image, $z_o$ denotes a z-coordinate of the real object, and d denotes a distance from the imaging lens to the diffraction grating.

6. The method of claim 1, wherein
the rearranging of the parallax images comprises respectively mapping the picked-up parallax images to minimum image areas defined in the virtual image plane,
each of the minimum image areas is determined based on a field of view of each of virtual pinholes defined in the same plane as the imaging lens, and
the virtual pinholes are virtual cameras defined in a same plane as the imaging lens.

7. The method of claim 6, wherein the picked-up parallax images are mapped to edges in the minimum image areas.

* * * * *